US010717261B2

United States Patent
Chiang et al.

(10) Patent No.: US 10,717,261 B2
(45) Date of Patent: Jul. 21, 2020

(54) SELECTIVELY ACTIVATED FRANGIBLE BONDING SYSTEM

(71) Applicant: Bell Helicopter Textron Inc., Fort Worth, TX (US)

(72) Inventors: Thomas S. Chiang, Dallas, TX (US); Jared Mark Paulson, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 63 days.

(21) Appl. No.: 15/788,506

(22) Filed: Oct. 19, 2017

(65) Prior Publication Data
US 2019/0118523 A1    Apr. 25, 2019

(51) Int. Cl.
| | | |
|---|---|---|
| B32B 43/00 | (2006.01) | |
| B32B 38/00 | (2006.01) | |
| B32B 37/12 | (2006.01) | |
| B64C 11/20 | (2006.01) | |
| B64D 15/12 | (2006.01) | |
| B29C 65/00 | (2006.01) | |
| B32B 7/06 | (2019.01) | |
| C09J 163/00 | (2006.01) | |
| B29C 65/48 | (2006.01) | |
| B64F 5/40 | (2017.01) | |
| B29C 65/76 | (2006.01) | |
| B29C 65/50 | (2006.01) | |
| B64C 27/473 | (2006.01) | |
| B64D 45/00 | (2006.01) | |
| B29L 31/08 | (2006.01) | |
| B29K 105/16 | (2006.01) | |

(52) U.S. Cl.
CPC ............ *B32B 43/006* (2013.01); *B29C 65/48* (2013.01); *B29C 65/483* (2013.01); *B29C 65/485* (2013.01); *B29C 65/488* (2013.01); *B29C 65/4815* (2013.01); *B29C 65/4855* (2013.01); *B29C 65/4865* (2013.01); *B29C 65/5057* (2013.01); *B29C 65/76* (2013.01); *B29C 66/45* (2013.01); *B29C 66/54* (2013.01); *B29C 66/543* (2013.01); *B29C 66/545* (2013.01); *B29C 66/721* (2013.01); *B32B 7/06* (2013.01); *B32B 37/12* (2013.01); *B32B 38/0008* (2013.01); *B64C 11/205* (2013.01); *B64D 15/12* (2013.01); *B64F 5/40* (2017.01); *C09J 163/00* (2013.01); *B29K 2105/167* (2013.01); *B29L 2031/082* (2013.01); *B32B 2310/0862* (2013.01); *B32B 2605/18* (2013.01); *B64C 27/473* (2013.01); *B64C 2027/4736* (2013.01); *B64D 2045/009* (2013.01)

(58) Field of Classification Search
CPC ... B32B 37/0008; B32B 38/12; B32B 43/006; B64C 11/205; B64C 27/473; B64D 15/12
See application file for complete search history.

(56) References Cited

U.S. PATENT DOCUMENTS

| | | | | |
|---|---|---|---|---|
| 10,468,286 B2 * | 11/2019 | Burggraf | ............ | H01L 21/6835 |
| 2014/0371341 A1 * | 12/2014 | Moszner | ............ | A61K 6/0002 523/116 |

* cited by examiner

*Primary Examiner* — Edward J Cain
(74) *Attorney, Agent, or Firm* — Fogarty LLP

(57) ABSTRACT

An intentionally activated frangible bonding system comprises a frangible adhesive, adhesive primer, composite material matrix, and/or the like, having a polydispersion of at least one additive spread throughout the frangible bonding material. The additive degrades a bond provided by the frangible bonding material, upon application of a specific energy to the frangible bonding material. An energy emitter is configured to selectively direct the specific energy toward a structure or assembly comprising components bonded by the frangible bonding material to degrade the frangible bonding material bonding the components for disassembly.

20 Claims, 5 Drawing Sheets

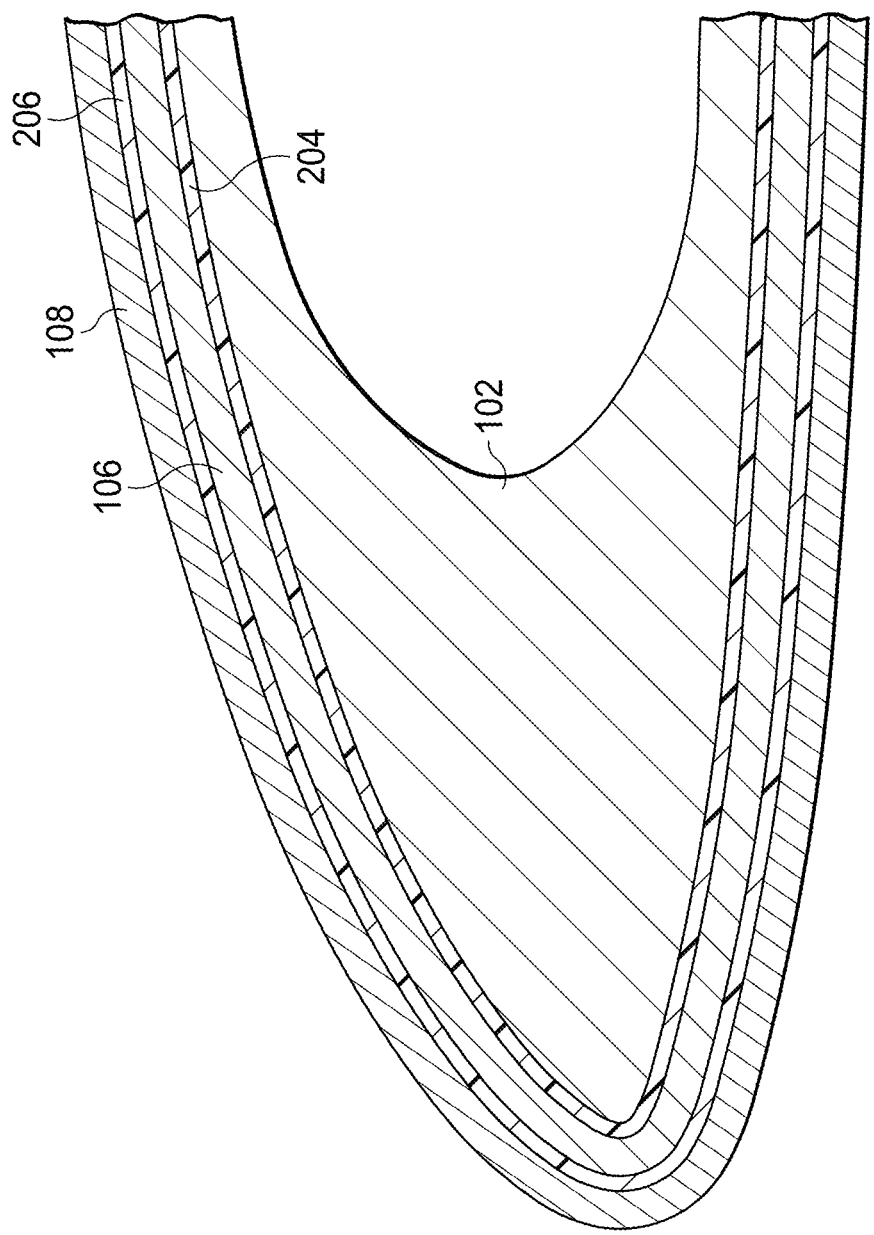
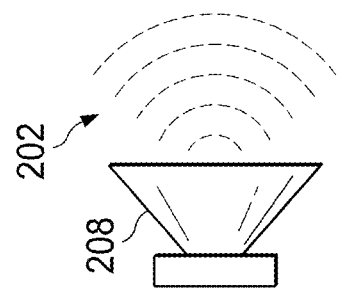
FIG. 2

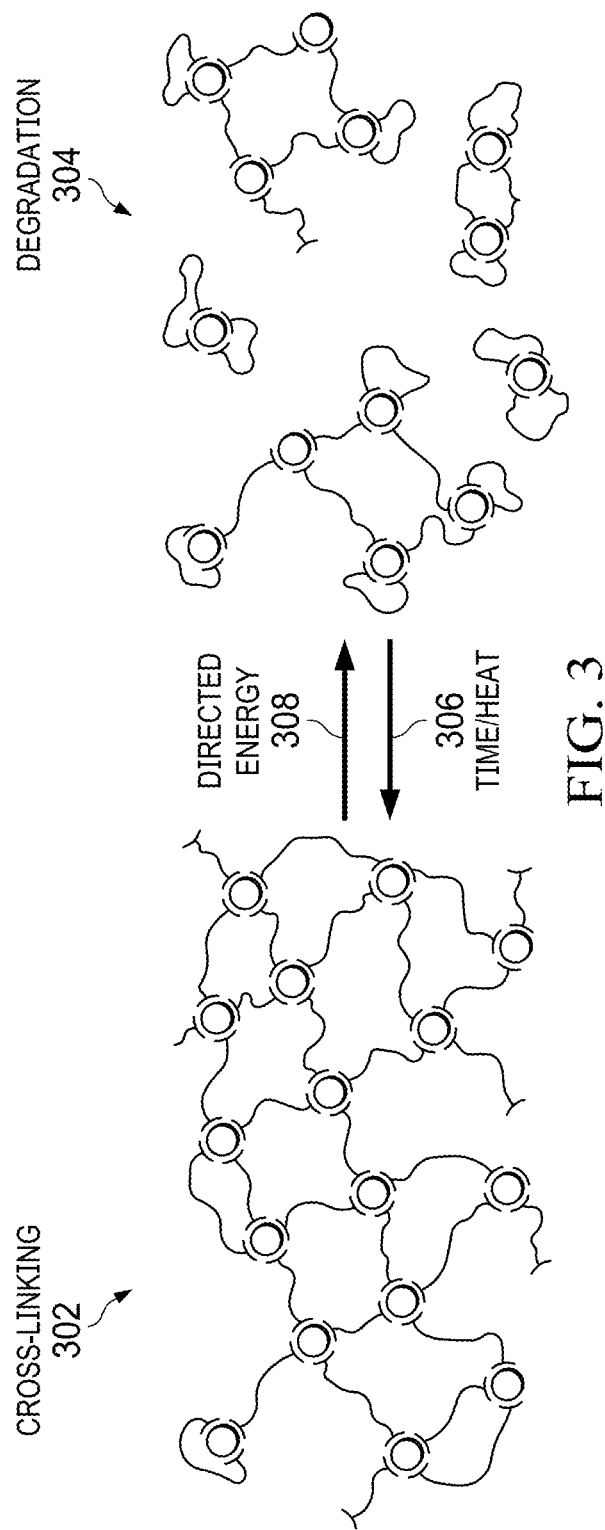

SELECTIVELY ACTIVATED FRANGIBLE BONDING SYSTEM

TECHNICAL FIELD

This invention is generally in the field of bonding materials such as adhesives, adhesive primers and/or composite material matrices, more particularly bonding materials that may be used in aircraft structure components, and relates specifically to selectively activated frangible bonding systems, such as selectively activated frangible adhesive, adhesive primer and/or composite material matrix systems and methods for degrading bondlines in such components for ease of disassembly of the components for repair and overhaul.

BACKGROUND

An adhesive layer is often required and desired to attach or bond two or more structures together in order to form an assembly that performs a function. As an example, a rotor blade of a rotorcraft is manufactured through several different adhesive bonding operations of many individual components to form a final blade assembly that will help give the aircraft lift while maintaining its structural integrity throughout all flight conditions and environments. Since the individual components of an assembly are shaped differently, made of different materials, and/or are affected differently by the various operational conditions, they wear and degrade at different rates. Also, a layer of primer, or the like, may be applied to the underlying structure and/or the overlaying structure may be applied to help ensure adhesion. Additionally, or alternatively, composite materials, which comprise at least one structural material and a matrix material, are used extensively in modern aircraft.

Aircraft are often required to fly in extreme environments such as sandy desert, rain or thunderstorms, around saltwater and/or in combat zones. In the case of rotorcraft, exposure to the elements can cause significant damage to rotor blade components over time, which often leads to repairs or replacement. Common damage that results in subcomponent removal of rotor blades includes erosion to the leading edge metal abrasion strip, ice protection failures to the heater blanket disposed beneath the metallic abrasion strip, impact damage to the upper and lower skins that cover the afterbody surfaces of the blade, and the like.

It is common to remove, repair, and replace certain damaged or degraded components of an assembly while reusing others. However, the methods of disassembly used today can be unsafe, labor-intensive, costly, disordered and damaging to the underlying or adjacent structure. In the case where removal, repair, and replacement of the damaged or degraded component is too difficult or costly, beyond economic repair, the components are often scrapped and replaced.

Traditional methods for disassembly of bonded components have involved the use of heat or other temperature degradation or embrittlement, electrical degradation, or mechanical disassembly of such components using force and/or sharp tools, all of which often cause damage to components intended to be salvaged. In the example of the removal of a damaged rotor blade component on a rotorcraft, the process is typically an operator-dependent and time-consuming process. Such removal of a damaged rotor blade component often employs a method that requires a high degree of craftsmanship and may be physically exhaustive. Various methods for removal of a damaged rotor blade component have been developed over the years. Such methods have been characterized as "messy," requiring specified tooling and support equipment, unsafe, risky in terms of both operator safety and/or potentially incurred damage to the component or assembly. Further, such removal of damaged rotor blade components may be limited to facilities with certain resources and infrastructure. With these existing methods of rotor blade component disassembly there is often unintentional damage incurred to the remaining structure of the blade. This may lead to increased cost for rework, and in many cases, scrapping of the component(s). As a typical, specific example, it is almost impossible to remove a good metallic abrasion strip without damaging it in order to replace a failed heater blanket that is disposed beneath the abrasion strip, at least in a reasonable amount of time. Conversely, in the case of an eroded abrasion strip, the removal process typically damages the underlying heater blanket, which may be functional and not in need of replacement.

These issues with the difficulty of disassembly of such components may be considered to result from design considerations for such a blade, expecting an abrasion strip and heater blanket to stay on the blade indefinitely. Just like all bonded structures, producibility and performance concerns revolve around strong and durable adhesion. Hence, as discussed above, good rotor blade components are often sacrificed during the removal process of a single damaged or failed part.

A specific example of removal of a failed heater blanket or eroded metal abrasion strip, using heat gun, wedges, hammers, chisels, and the like, includes an operator using the heat gun to soften the underlying bondline in order to slip in wedges under the edges of the metallic substrate all the way around the abrasion strip. Then, a large hammer or mallet is used to apply force to the wedges in order to locally dis-bond the abrasion strip. Pliers or mandrels may also be used to help peel back the metal of the abrasion strip, such as in long narrow bands (i.e. in can key strip opening fashion). Once the abrasion strip is removed, the thin heater blanket layer is chiseled away. Then, the remaining heater blanket material and adhesive remaining on underlying components is sanded down, in attempt to reveal an undamaged rotor spar or sheath underneath the heater blanket. Often, the hammering of wedges or chiseling leads to damage to spar or sheath plies, resulting in a scrapped part or rotor blade, particularly if a local repair to the spar or sheath plies is not sufficient. This removal of a failed heater blanket or eroded metal abrasion strip is a time-consuming, unclean, and costly method for rotor blade component removal that does not always result in success.

In another specific example of removal of a failed heater blanket or eroded abrasion strip using dry ice, wedges, hammers, and the like, there is more potential for successful abrasion strip removal, while preserving the underlying heater blanket. Therein, a dry ice bath is used to lower the temperature of the metal substrate of the abrasion strip. This method requires more, typically a considerable amount of more, special tooling and equipment that is tailored to the specific blade in order to acquire consistent cooling across the abrasion strip to be removed. The dry ice can be dangerous to personnel and must be handled with care. This is also a very tedious and operator dependent process when done correctly. The temperature of the metal must be tightly controlled for successful removal, so the time in the dry ice bath must be closely monitored. The part, or overall blade structure, can be permanently damaged if left in the dry ice bath too long. The cooling of the metal causes thermal contraction/expansion such that the part (metal adhesion strip) moves relative to the underlying blade structure. The idea is to create a clean disbond with this process, without damaging any components. When a clean disbond is not accomplished, sometimes hammers and wedges are used at the part edges. There is still considerable room for error in this process and it may not save any time or cost over other methods, such as use of a heat gun, as described above, use of an electrical current to degrade the bond, or the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention provides an intentionally activated frangible bonding system that comprises a frangible adhesive, adhesive primer, composite material matrix, or the like having a polydispersion of at least one additive spread throughout the frangible bonding material. The additive is intended to degrade a bond provided by the frangible bonding material upon application of a specific energy to the frangible bonding material. To such end, the intentionally activated frangible bonding system also includes an energy emitter configured to selectively direct the specific energy toward a structure or assembly comprising components bonded by the frangible bonding material to degrade the frangible bonding material bonding the components.

Thus, a method for selective disassembly of bonded structures or assemblies in accordance with the present invention may include bonding together components of a structure or assembly intended to be disassembled at a later time using a frangible bonding material, directing a specific energy toward the structure or assembly comprising the components bonded using the frangible bonding material to degrade the frangible bonding material bonding the components, and separating the components, disassembling the structures or assemblies. In accordance with such a method employing an intentionally activated frangible bonding material, such as a frangible adhesive, frangible adhesive primer, frangible composite material matrix, or the like, the frangible bonding material may include a polydispersion of at least one additive spread throughout a bonding material, to provide the frangible bonding material.

Hence, in particular implementations or embodiments, an aircraft component structure may include a first aircraft component, a second aircraft component and a frangible adhesive bonding the first component to the second component. Therein, the frangible adhesive may comprise a polydispersion of at least one additive, spread throughout the adhesive. This additive may degrade a bond provided by the frangible adhesive bonding the first component to the second component, upon application of a specific energy to the frangible adhesive.

In accordance with various implementations and embodiments of the present intentionally activated frangible bonding system and/or a method for disassembly of structures or assemblies bonded using such a frangible bonding material, the additives may employ carbon nanotubes, a dipole agent that reacts in a predetermined manner under a specific electromagnetic energy, or the like. For example, a specific dipole agent employed as a frangible bonding material additive may react to degrade the bonding material's bond under a specific microwave energy. Thus, the specific energy may be a specific electromagnetic energy, such as the aforementioned specific microwave energy or it may be a different type of energy such as ultrasound, or the like.

For application of the specific energy, the energy emitter may be shaped to conform to a shape of a specific structure, assembly or component thereof that is to be disassembled, so as to direct the specific energy toward one or more specific bondlines for specific components in the structure or assembly. Alternatively, or additionally in some cases, the energy emitter may be configured to be spaced apart from the specific structure, assembly or component thereof. Regardless, in various implementations and embodiments the energy emitter may be additionally, or alternatively, configured to direct the specific energy a predetermined distance into the specific structure, assembly or component thereof to one or more specific bondlines for the specific components in the structure or assembly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
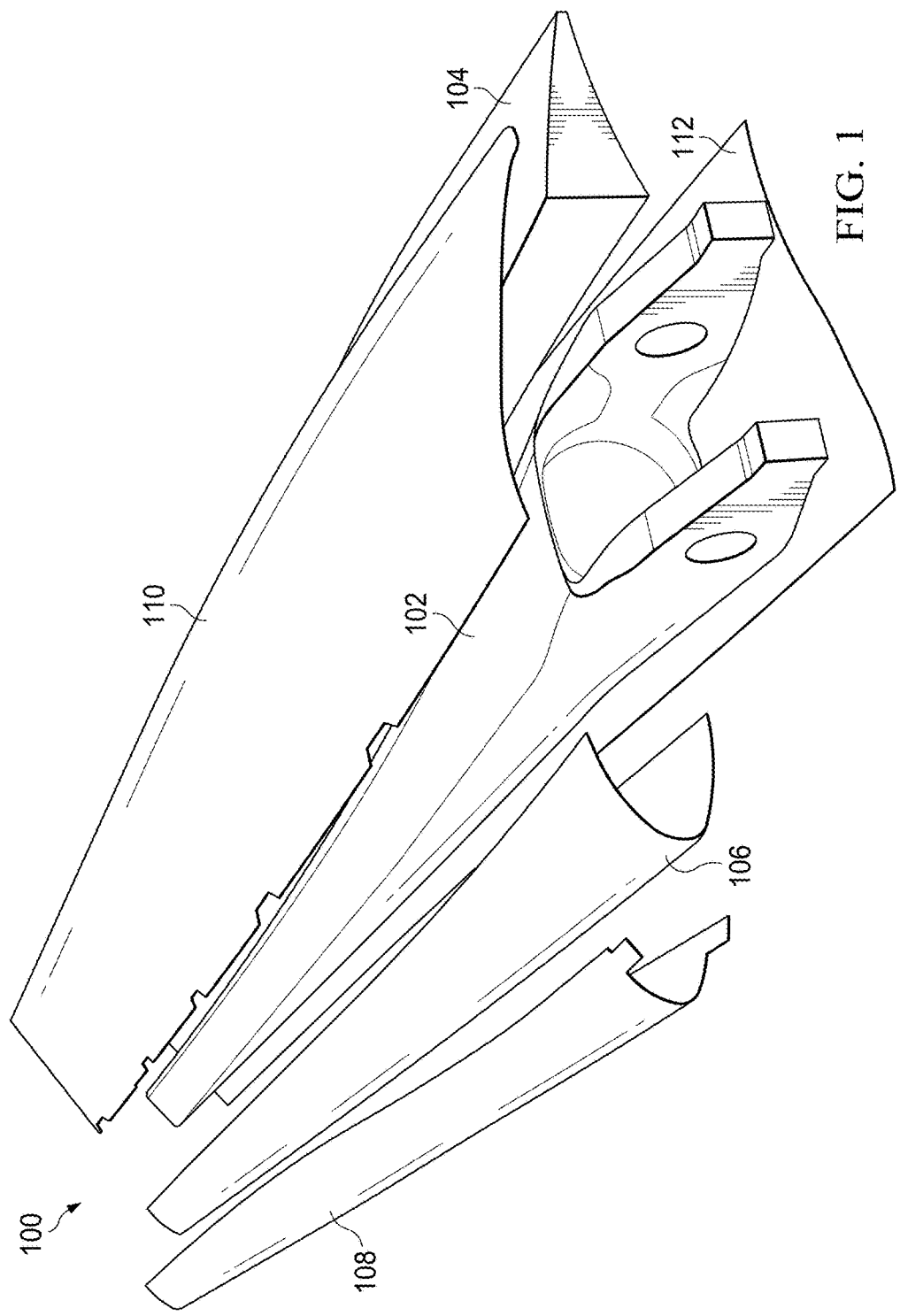
Figure 4A:
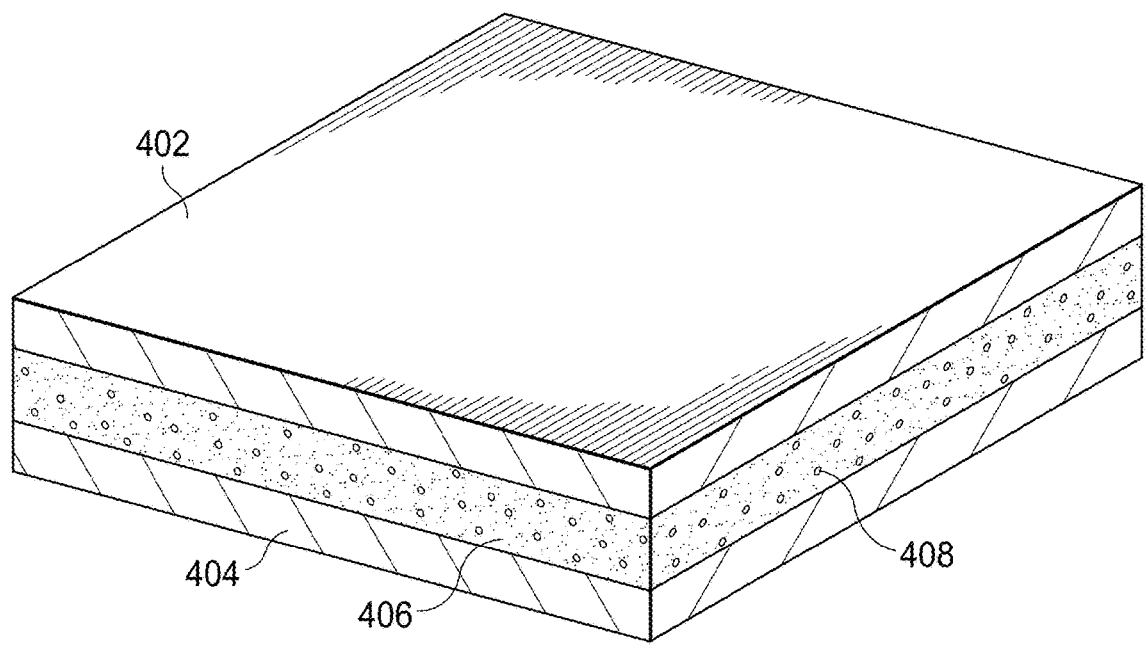
Figure 4B:
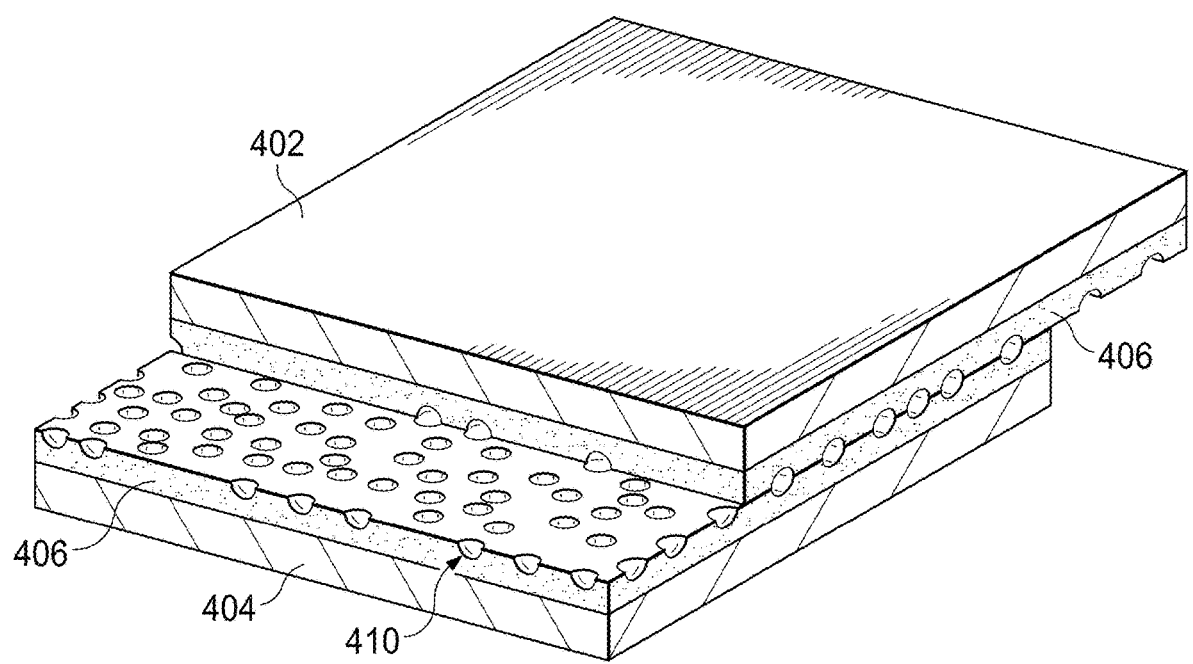
Figure 5:
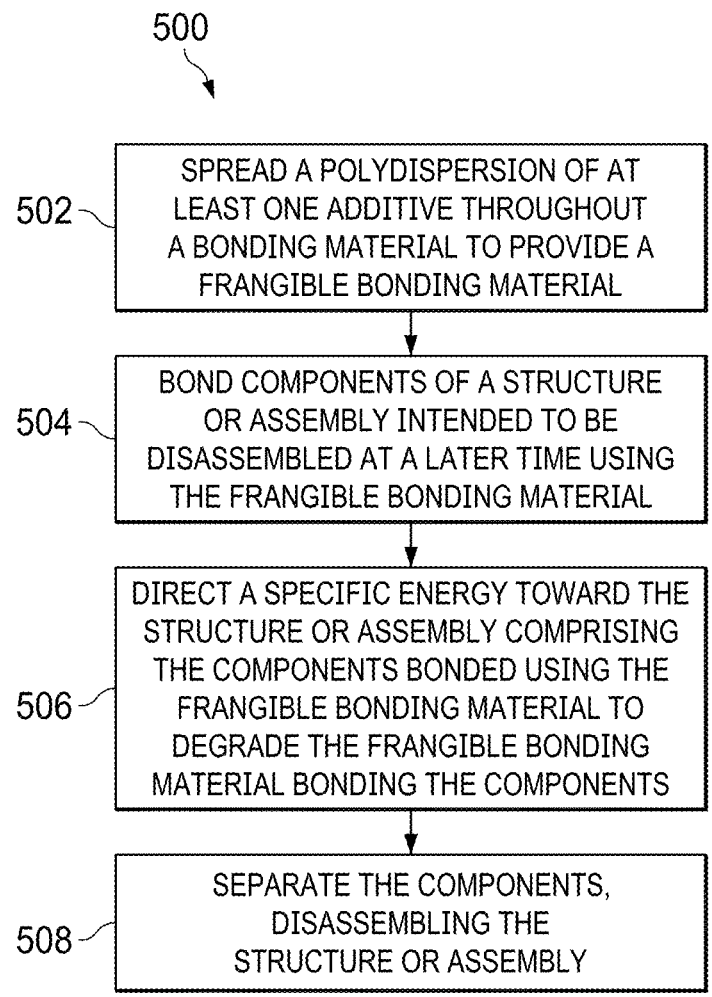

Having thus described the invention in general terms, reference will now be made to the accompanying drawings, which are not necessarily drawn to scale and which are incorporated in and form part of the specification and in which like numerals designate like parts, illustrate embodiments of the present invention and together with the description, serve to explain the principles of the invention. In the drawings:

FIG. 1 is a diagrammatic exploded illustration of a proprotor blade showing commonly removed and replaced components exploded-out from the main spar of the proprotor blade as an environment in which embodiments of the present systems and methods may be used;

FIG. 2 is a diagrammatic illustration of a cross section of a proprotor blade, or the like, with ultrasound or directed energy being applied in accordance with embodiments of the present systems and methods for selectively activated frangible bonding system;

FIG. 3 is a diagrammatic illustration of polymer bonding material cross-linking and directed energy degradation of the polymer bonding material, in accordance with embodiments of the present systems and method;

FIGS. 4a and 4b are a diagrammatic illustration of directed energy bondline degradation in accordance with embodiments of the present systems and methods; and FIG. 5 is a flowchart of an implementation of directed energy bondline degradation for disassembly of bonded structures and assemblies, in accordance with at least one embodiment of the present systems and methods.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present selectively activated frangible bonding systems and methods relate generally to bonding materials, more particularly adhesives, adhesive primers and/or composite material matrices, such as may be used in aircraft structure components. As used herein, the term "bonding" or "bond" such as used in the terms "bonding material," "bonding systems," or likewise, is intended to encompass not only adhesives, but also adhesive primers, composite material matrices, and the like, which may be comprised of thermoset and/or thermoplastic polymers, or the like, such as may be used in aircraft and similar industries for bonding components and/or as composite material matrices. The present systems and methods relate specifically to selectively activated frangible bonding systems and methods for degrading bondlines in such components for ease of disassembly of the components for repair and overhaul. Thereby, the present systems and methods for designed bondline degradation for disassembly of bonded structures and assemblies are particularly useful with respect to aircraft structures, more particularly repair of aircraft structures. As noted above, the methods of disassembly of bonded aircraft components used today can be unsafe, labor-intensive, costly, messy and damaging to the underlying or adjacent structures.

In accordance with embodiments of the present selectively activated frangible bonding systems and methods, a solution to this problem is one that is designed to degrade a bondline for disassembly of bonded structures and assemblies. Therein, an intentionally activated frangible bonding system comprises a frangible adhesive, frangible adhesive primer, frangible composite material matrix, or the like having a polydispersion of at least one additive spread throughout. As used herein the term "polydispersion" refers to a generally homogeneous, yet nonuniform distribution of the additive throughout the bonding material. The additive degrades a bond provided by the frangible bonding material, upon application of a specific energy to the frangible bonding material. An energy emitter, or the like is configured to selectively direct the specific energy toward a structure or assembly comprising components bonded by the frangible bonding material to degrade the frangible bonding material bonding the components, for disassembly.

In accordance with embodiments of the present systems and methods, a designed degradation layer may improve upon existing, typical methods of removal of bonded aircraft components from one another, as well as preserve surrounding details or features that have historically become collateral in the removal process. Such systems and methods improve maintenance costs, supply disruptions, cycle time, and the economics of component replacement. The present selectively activated frangible bonding systems and methods facilitate intentional bondline degradation for disassembly of rotor blade components and involves an energy source that causes a predictable, desired reaction within the component or assembly. These systems and methods are intended to improve upon legacy methods involving heat, temperature degradation or embrittlement, electrical degradation, or mechanical disassembly. Embodiments of the present systems and methods may employ ultrasonic scission of a targeted polymeric material within the component or assembly. Ultrasound frequencies can be varied and applied to a target and degrade specific polymeric chains within the selected bondline to achieve a breakdown at the molecular level, in accordance with embodiments of the present systems and methods. Embodiments of the present systems and methods may alternatively or additionally use an energetic source that causes elevated levels of degradation within a targeted layer, such as a microwave source heating a designed layer filled with dipole additives (i.e. an additive having a concentration of positive electric charge separated from a concentration of negative charge, such as on the molecular or nanometer scale). These systems and methods can, for example, enable an easier and safer method of removal of a rotor abrasion strip, heater blanket, sheath, or skin from the underlying blade structure, or any bonded feature within an assembly or subassembly, and/or the like. Ultrasonic scission or directed energy degradation as a method of bonded component disassembly could provide benefits in terms of cost, processing time, quality, and repeatability, as well as workforce safety.

FIG. 1 is a diagrammatic exploded illustration of a rotor blade, particularly proprotor blade 100, showing commonly removed and replaced components exploded-out from main spar 102 and afterbody 104 of proprotor blade 100, as an environment in which embodiments of the present systems and methods may be used. Therein, underlying rotor spar 102 is shown, to which wherein rotor afterbody 104 may be affixed, adhered or otherwise secured. Spar 102 may be a more-or-less solid structural member of rotor 100, while afterbody 104 may be a composite, honeycombed or similar structure defining a trailing portion and edge of rotor 100. Sheath or ice prevention or removal heating blanket 106 may be adhered to a leading surface of main spar 102, and in turn abrasion strip 108 (which may be metal, such as titanium or nickel) is adhered to and over sheath or heating blanket 106. Upper and lower skins 110 and 112 are adhered to and generally cover afterbody 104 and the trailing portion of spar 102 not covered by abrasion strip 108.

Embodiments of the present systems and methods may provide an aircraft component structure comprising a first aircraft component, a second aircraft component and a frangible adhesive bonding the first component to the second component. Therein, the frangible adhesive incorporates a polydispersion of at least one additive spread throughout the adhesive. These additives may take the form of particulates, catalysts, or the like, wherein the additive degrades a bond bonding the first component to the second component upon application of a specific energy to the frangible adhesive in accordance with embodiments of the present systems and methods.

FIG. 2 is a diagrammatic illustration of a cross-section of a leading edge portion a proprotor blade, such as proprotor blade 100 of FIG. 1, or the like, with ultrasound or directed energy 202 being applied in accordance with embodiments of the present systems and methods for bondline degradation to facilitate disassembly of bonded structures and assemblies. In FIG. 2, spar 102 is shown with sheath or heater blanket 106 adhered thereto by adhesive layer 204. In turn, abrasion strip 108 is shown as adhered to sheath or heating blanket 106 by adhesive layer 206. The adhesive making up adhesive layers 204 and 206 may be a liquid adhesive, such a multi-part epoxy, film adhesive, or the like. These adhesive layers may be activated in a prescribed manner to provide bonding, such as mixing of epoxy parts or application of an energy such as heat. Further, a layer of primer, or the like, may be applied to the underlying structure and/or the overlaying structure may be applied to help ensure adhesion.

In accordance with various embodiments of the present systems and methods, the adhesive material that makes up bondline layer 204 or 206 between two components 102 and 106 or 106 and 108, respectively, and/or a primer applied to each of the interfacing surfaces of these components to facilitate bonding of the adhesive to each component, includes a polydispersion of additives spread throughout the material. These designed/tailored additives act passively within structure 100 except when a specific directed energy 202, or other interrogation source besides temperature or mechanical force, is applied, such that elevated levels of degradation are achieved within that layer.

Hence, in accordance with embodiments of the present systems and methods, directed energy 202, such as the aforementioned and below-discussed ultrasound or electromagnetic energy (e.g. microwaves, etc.) may be produced and/or directed toward structures to be disbonded by emitter 208. The specific energy is preferably of a power, frequency, amplitude, deflection, etc. appropriate to the mass (of the bonding material) to be excited. Emitter 208 may be spaced apart or in close, proximal or direct contact with structure components. The additive facilitates bondline failure/fracture once designed energy 202 is applied. Once the bondline has been sufficiently degraded, further fracture within the bondline may be accomplished with relative ease, such that damaged or non-compliant structure(s) (106 and/or 108) can be removed.

Thus, embodiments of the present selectively activated frangible bonding system may make use of an energy emitter (208) of some type or nature. This energy emitter selectively directs specific energy 202, which causes the frangible adhesive's bond to degrade, toward a structure or assembly made up of components bonded by the frangible adhesive to degrade the frangible adhesive bonding the components for separation of the components from one another, such as for disassembly of the structure or assembly. That is, a user may use the energy emitter to direct the specific energy toward, but through, a surface of the structure or assembly to reach an underlying adhesive layer bonding components of the structure. As a result, the energy interacts with the additive spread throughout the frangible adhesive, causing the adhesive, or at least the adhesive's bond to degrade. This "disbonds" the components allowing them to mechanically separate, or to be more easily mechanically separated from one another, for disassembly.

To such ends, the energy emitter may, in various embodiments, be shaped to conform to a shape of a specific structure, assembly or component thereof, and thereby to direct the specific energy toward one or more specific adhesive bondlines for specific components in the structure or assembly. In such embodiments, the energy emitter may be configured, such as through control of a power, frequency, amplitude, deflection, or the like of the emitted specific energy, to direct the emitted specific energy a predetermined distance into the structure, assembly or component thereof, so as to reach one or more target bondlines of specific components of the structure or assembly that are to be disbonded. Alternatively, the energy emitter may be configured to be spaced apart from the specific structure or assembly, such as a specific or specified distance, such that the emitted energy penetrates a predetermined distance into the specific structure, assembly or component thereof to one or more specific bondlines for specific components of the structure or assembly to be separated. In an example of either, using the illustrated proprotor blade 100 of FIG. 2, energy 202 emitted by emitter 208 may only reach to adhesive layer 206, so as to disbond abrasion strip 108 from heater blanket/sheath 106, without affecting adhesive layer 204 or the bond between heater blanket/sheath 106 and spar 102 provided by adhesive layer 204, allowing heater blanket/sheath 106 to remain bonded to spar 102, while allowing abrasion strip 108 to be removed from proprotor blade 100, without damaging heater blanket/sheath 106.

Additionally, the energy emitter may make use of more than one type of energy, or more than one energy emitter may be used to direct more than one type of energy into the structure to break adhesive bonds. For example, microwave energy may be emitted to embrittle a frangible adhesive, while, or subsequently, ultrasound may be used to break the adhesive up, facilitating separation and disassembly of the formerly bonded components.

The above description focuses on degradation of a frangible adhesive layer. However, as noted, the present systems and methods may be applied to other layers or bonding materials. As one example a frangible primer layer (i.e. a layer of primer that has a polydispersion of at least one frangible additive spread throughout) between adhesive layer 206 and abrasion strip 108, and/or a frangible primer layer between adhesive layer 206 and heater blanket/sheath 106 may be targeted with a specific energy to cause degradation of the primer for removal of the abrasion strip.

Similarly, embodiments of the present intentionally activated frangible bonding system may employ a frangible composite material matrix (i.e. a matrix material component of a composite structure that includes a polydispersion of at least one frangible additive spread throughout). As with a frangible adhesive, primer, of the like, the additive degrades the frangible composite matrix material, upon application of a specific energy to the frangible composite matrix material to degrade the composite material to facilitate removal of the composite material and/or to free structures bonded to the composite material by the frangible composite matrix material. Such a frangible composite material matrix may degrade as collateral in the removal of a desired detail. Such collateral materials may be easier to add, as a patch or repair, such as when economically justified.

Two primary polymers, thermoset and thermoplastic, are used in the aircraft and similar industries for bonding components and/or as composite material matrices. Thermoplastic may be generally seen as "melting" when hot, but solid "crystalline or semi-crystalline" when cold or ambient. While most rotorcraft, and similar, structural adhesives and composites are thermosets, and hence, polymeric bondline or composite matrix materials are crosslinked during cure, a rapidly developing and maturing segment in the composites industry employs thermoplastics, wherein thermoplastic polymers solidify into crystalline or semi-crystalline microstructures.

That said, FIG. 3 is a diagrammatic illustration of frangible (thermoset) polymer bonding material (i.e. frangible adhesive, frangible adhesive primer, frangible composite material matrix, or the like) cross-linking 302 and directed energy degradation 304 of the polymer bonding material cross-linking, in accordance with embodiments of the present systems and method. To bond components, a first type of energy 306 (such as heat) may be applied, or other curing mechanism, such as time, may provide bonding material cross linking 302.

For example, thermosetting polymers, like adhesives used for structural bonds, composite matrices, or the like, have polymer chains (like proteins) or polymeric crystalline structures that make up the molecular structure of the substance. Heat may be applied to the material to speed cure kinetics of the thermosetting polymer, and thereby speed cross-linking of the polymer chains, which increases strength and achieves a structural bond. However, in the case of structural two-part paste or liquid adhesives, room temperature cures are common. In general, temperature and time add to the degree of crystallinity of thermoplastic composites (i.e. quickly "quenching" the polymer material after melt reduces the degree of crystallinity and increases the "amorphous" phase). In both thermosetting and thermoplastic composites, increased crosslinking (thermosets) and increased crystallinity (thermoplastics) increase mechanical performance and chemical/physical properties. Regardless, in accordance with various embodiments of the present systems and methods, a tailored bonding material may be formulated to degrade with interrogation sources not encountered in the operating environment.

Thus, when it is desired to break this bond for disassembly of structural components, an interrogating energy source, such as ultrasonic frequencies are varied and applied to target and degrade specific polymeric chains within the bonding material to achieve a breakdown at the molecular level, in accordance with such embodiments of the present systems and methods. In accordance with such embodiments, directed energy 308, such as ultrasound, microwave, or the like may be directed toward bonding material, such as an adhesive layer, primer layer or composite matrix to degrade the adhesive layer, primer layer or composite matrix to provide directed energy degradation 304 of the polymer bonding material cross-linking or crystallinity. In accordance therewith, in one example, ultrasonic scission of the polymer backbone can occur at any bond location within the chains. Once the bondline has been compromised, disassembly should be significantly easier without incurring additional damage to the structure.

To wit, FIGS. 4a and 4b are a diagrammatic illustration of directed energy bondline degradation in accordance with embodiments of the present systems and methods. FIG. 4a illustrates structures 402 and 404 bonded by adhesive 406, which, in accordance with embodiments of the present systems and methods, includes additives 408. In accordance with embodiments of the present selectively activated frangible bonding system, frangible adhesive 406 comprises a polydispersion of at least one additive 408 spread throughout the frangible adhesive. This additive degrades a bond provided by the frangible adhesive upon application of a specific energy to the frangible adhesive. This additive may be made up of any material or materials, which upon activation by a particular energy, will cause the degradation of the bonding properties of the cured, or otherwise activated, adhesive. As noted, this additive may be carbon nanotube-based, it may comprise a specific dipole agent that reacts in a designed manner under electromagnetic energy to degrade the bond, or the like. As also noted, a dipole agent may be activated by microwave energy, while alternative additives may be activated by other electromagnetic energy, ultrasonic energy, or the like. However, the energy should not be of a nature typically encountered during operation of the bonded structure, or even energy of a nature encountered in extreme operating conditions for the bonded structure.

FIG. 4b depicts bondline degradation in adhesive 406 after bondline degrading energy is applied to facilitate bondline fracture in accordance with embodiments of the present systems and methods, such as through activation of additives 408 of FIG. 4a resulting in degradation 410 along adhesive bondline 406, as shown in FIG. 4b. Similar degradation of bonding may be provided in embodiments where a frangible primer applied to structure(s) 402 and/or 404 to facilitate adhesion of adhesive 406 to the structure is subjected to degrading energy, rather than, or in addition to, adhesive 406.

Thereby, in accordance with embodiments of the present systems and methods a mechanically activated (i.e. intentionally or selectively activated) phenomenon, such as a specific ultrasonic frequency and amplitude or activation energy, is used to degrade a bonding material (i.e. an adhesive, adhesive primer, composite material matrix, or the like). Therein, additives, particulates, or catalysts incite frangibility tuned to an external energy source to change the additive's state and interrupt the adhesive or primer characteristics of the target bonding material.

FIG. 5 is a flowchart of implementation 500 of directed energy bondline degradation for disassembly of bonded structures and assemblies, in accordance with at least one embodiment of the present systems and methods. Therein, an embodiment for disassembly of bonded structures or assemblies in accordance with embodiments of a selectively activated frangible bonding system is detailed and calls for inclusion of at least one additive spread throughout a bonding material (i.e. an adhesive, an adhesive primer, a composite material matrix, or the like) to provide a frangible bonding material. For example, at 502, a polydispersion of at least one additive is spread throughout a bonding material to provide the frangible bonding material. In certain embodiments, this additive may be carbon nanotube-based, it may comprise a specific dipole agent that reacts in a specified manner under electromagnetic energy to degrade the bond, or the like. For example, a dipole agent may be activated by microwave energy, while alternative additives may be activated by other electromagnetic energy, ultrasonic energy, or the like. In accordance with embodiments of the present systems and methods, potential sources and/or combinations of energy and/or additives could be ultrasonic, chemical, magnetorheological, microspheres of degrading material or solvent, etc. However, the energy should not be of a nature typically encountered during manufacturing, inspection, handling, or operation of the bonded structure, or even energy of a nature encountered in extreme operating conditions for the bonded structure. For example, the specified energy to degrade the bonding material should be specified so as to avoid such ranges to prevent premature failure of the structural component. For example, in rotorcraft ultrasonic inspection typically uses high frequency sound waves in the range of 0.5 to 15 MHz. Hence, embodiments of the present systems and methods for selective activation of frangible bonding material using ultrasound would not want to employ these (or relatively adjacent) frequencies. Similarly, the frangible bonding material (i.e. frangible adhesive, frangible adhesive primer, frangible composite material matrix, or the like) still needs to provide bonding appropriate to the operating environment of the bonded structure(s). For example, in rotorcraft this may call for the present frangible adhesive system to bond primary composite and metallic structures and withstand temperature ranges of up to 250 to 400 degrees Fahrenheit.

At 504, components of a durable structure or assembly, which may need to be disassembled at a later time, are bonded (together) using a frangible bonding material. That this, in a durable structure, which may need to be disassembled at a later time for repair, maintenance, or the like, structure or assembly components may be bonded together, at 504, using the frangible adhesive, frangible adhesive primer, frangible composite material matrix, or the like of the present systems and methods, to facilitate such later dismantling.

When it becomes desirable to disassemble part, or all, of this durable structure or assembly, energy of a specific type may be directed toward the structure or assembly at 506 to degrade the frangible bonding material bonding the components. Thereafter, the structure or assembly components may be separated at 508 to thereby disassemble the structure or assembly, at least in part.

Further, it should also be noted that in accordance with the present systems and methods that the degradable adhesive may be tailored specifically for use with bonded details that are designed for ease of removal and/or separation from each other, such that the application of the removal energy source will have no adverse effect on surrounding bondlines that should maintain their bond integrity.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A selectively activated frangible bonding system comprising:
   a frangible bonding material comprising a polydispersion of at least one additive spread throughout the frangible bonding material, the additive degrading a bond provided by the frangible bonding material upon application of a specific ultrasonic energy to the frangible bonding material; and
   an energy emitter device configured to selectively direct the specific ultrasonic energy toward a structure or assembly comprising components bonded by the frangible bonding material to degrade the frangible bonding material bonding the components.

2. The system of claim 1, wherein the frangible bonding material comprises at least one of a frangible adhesive, frangible adhesive primer and frangible composite material matrix.

3. The system of claim 1, wherein the least one additive further comprises carbon nanotubes.

4. The system of claim 1, wherein the least one additive further comprises a dipole agent that reacts under a specific electromagnetic energy.

5. The system of claim 1, wherein another specific energy is a specific electromagnetic energy.

6. The system of claim 1, wherein another specific energy is a specific microwave energy.

7. The system of claim 1, wherein the energy emitter is shaped to conform to a shape of a specific structure, assembly or component thereof, and is configured to direct the specific energy toward one or more specific frangible bondlines for specific components in the structure or assembly.

8. The system of claim 7, wherein the energy emitter is further configured to direct the specific energy a predetermined distance into the specific structure, assembly or component thereof to one or more specific frangible bondlines for the specific components in the structure or assembly.

9. The system of claim 1, wherein the energy emitter is configured to be spaced apart from a specific structure, assembly or component thereof.

10. The system of claim 9, wherein the energy emitter is further configured to direct the specific energy a predetermined distance into the specific structure, assembly or component thereof to one or more specific bondlines for the specific components in the structure or assembly.

11. A method for disassembly of bonded structures or assemblies comprising:
    bonding components of a structure or assembly intended to be disassembled at a later time using a frangible bonding material;
    directing a specific microwave energy toward the structure or assembly comprising the components bonded using the frangible bonding material, degrading the frangible bonding material bonding the components; and
    separating the components, disassembling the structure or assembly.

12. The method of claim 11, wherein the frangible bonding material comprises at least one of a frangible adhesive, frangible adhesive primer and frangible composite material matrix.

13. The method of claim 11, further comprising including a polydispersion of at least one additive spread throughout a bonding material to provide the frangible bonding material.

14. The method of claim 12, wherein the additives comprise carbon nanotubes.

15. The method of claim 12, wherein the additives comprise a specific dipole agent that reacts under a specific electromagnetic energy.

16. The method of claim 11, wherein a further specific energy is a specific ultrasonic energy.

17. The method of claim 11, wherein a further specific energy is a specific electromagnetic energy.

18. An aircraft component structure comprising:
    a first aircraft component;
    a second aircraft component;

a frangible adhesive bonding the first component to the second component, the frangible adhesive comprising a polydispersion of at least one additive, including a carbon nanotube-based additive, spread throughout the adhesive, the additive degrading a bond provided by the frangible adhesive bonding the first component to the second component, upon application of a specific energy to the frangible adhesive.

19. The aircraft component structure of claim 18, wherein the specific energy is a specific ultrasonic energy.

20. The aircraft component structure of claim 18, wherein the specific energy is a specific electromagnetic energy.

* * * * *

UNITED STATES PATENT AND TRADEMARK OFFICE
CERTIFICATE OF CORRECTION

PATENT NO. : 10,717,261 B2  
APPLICATION NO. : 15/788506  
DATED : July 21, 2020  
INVENTOR(S) : Chiang et al.

Page 1 of 1

It is certified that error appears in the above-identified patent and that said Letters Patent is hereby corrected as shown below:

In the Claims

In Column 12, Line 56, Claim 14, delete "claim 12" and insert -- claim 13 -- therefor.

In Column 12, Line 58, Claim 15, delete "claim 12" and insert -- claim 13 -- therefor.

Signed and Sealed this  
Twenty-fifth Day of August, 2020

Andrei Iancu  
*Director of the United States Patent and Trademark Office*